US009262087B2

(12) United States Patent
Chaurasia et al.

(10) Patent No.: US 9,262,087 B2
(45) Date of Patent: *Feb. 16, 2016

(54) NON-DISRUPTIVE CONFIGURATION OF A VIRTUALIZATION CONTROLLER IN A DATA STORAGE SYSTEM

(71) Applicant: International Business Machines Corporation, Armonk, NY (US)

(72) Inventors: Ashish Chaurasia, Pune (IN); Subhojit Roy, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/626,818

(22) Filed: Feb. 19, 2015

(65) Prior Publication Data
US 2015/0160878 A1 Jun. 11, 2015

Related U.S. Application Data

(63) Continuation of application No. 14/201,745, filed on Mar. 7, 2014, now Pat. No. 8,996,758, which is a continuation of application No. 13/222,153, filed on Aug. 31, 2011, now Pat. No. 8,713,218.

(51) Int. Cl.
G06F 3/00 (2006.01)
G06F 3/06 (2006.01)
G06F 12/08 (2006.01)

(52) U.S. Cl.
CPC .............. *G06F 3/0619* (2013.01); *G06F 3/061* (2013.01); *G06F 3/067* (2013.01); *G06F 3/0617* (2013.01); *G06F 3/0632* (2013.01); *G06F 3/0635* (2013.01); *G06F 3/0637* (2013.01); *G06F 3/0665* (2013.01); *G06F 3/0689* (2013.01); *G06F 12/0866* (2013.01)

(58) Field of Classification Search
None
See application file for complete search history.

(56) References Cited

U.S. PATENT DOCUMENTS 6,763,436 B2 7/2004 Gabber et al.
7,162,582 B2 1/2007 Horn et al.
(Continued)

OTHER PUBLICATIONS

Office Action, dated Jan. 29, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-22.
(Continued)

*Primary Examiner* — Idriss N Alrobaye
*Assistant Examiner* — Dayton Lewis-Taylor
(74) *Attorney, Agent, or Firm* — David W. Victor; Konrad, Raynes, Davda and Victor LLP

(57) ABSTRACT

Embodiments of the invention relate to configuring a virtualization controller in SAN data storage system without disrupting I/O operations. One aspect of the invention concerns a method that comprises establishing a first data path between a host and a storage controller in the same communication zone wherein the storage controller comprises storage devices for storing data; adding a virtualization controller to the zone wherein the virtualization controller maps the storage devices to virtual volumes and establishes a second data path between the host and the storage devices through the virtual volumes; removing the first data path in response to the host detecting the second data path; and performing I/O operations between the host and the storage devices through the second data path.

20 Claims, 7 Drawing Sheets

(56) References Cited

U.S. PATENT DOCUMENTS

| | | | |
|---|---|---|---|
| 7,761,629 | B2 | 7/2010 | Butler et al. |
| 7,774,465 | B1 | 8/2010 | Ibrahim et al. |
| 7,856,022 | B1 | 12/2010 | Wigmore et al. |
| 8,028,062 | B1 | 9/2011 | Wigmore et al. |
| 8,332,613 | B1 | 12/2012 | Glade et al. |
| 8,713,218 | B2 | 4/2014 | Chaurasia et al. |
| 2006/0282639 | A1 | 12/2006 | Liu et al. |
| 2007/0016745 | A1 | 1/2007 | Dalton et al. |
| 2007/0067516 | A1 | 3/2007 | Do et al. |
| 2008/0256145 | A1 | 10/2008 | Dalton et al. |
| 2008/0320134 | A1 | 12/2008 | Edsall et al. |
| 2013/0054846 | A1 | 2/2013 | Chaurasia et al. |

OTHER PUBLICATIONS

Response to Office Action, dated Apr. 29, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-11.

Supplemental Amendment, dated May 3, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-6.

Final Office Action, dated Aug. 16, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-13.

Response to Final Office Action, dated Nov. 19, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-12.

Amendment, dated Dec. 11, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-13.

Notice of Allowance, dated Dec. 11, 2013, for U.S. Appl. No. 13/222,153, filed Aug. 31, 2011, entitled "Non-Disruptive Configuration of a Virtualization Cotroller in a Data Storage System", invented by Ashish Chaurasiaet al., pp. 1-13.

EMC Corporation, "Deploying A Virtual Infrastructure for SAP with EMC an VMware Technologies", White Paper, dated Feb. 2009, pp. 1-25.

IBM SAN Volume Controller Information Center, web link:http://publib.boulder.ibm.com/infocenter/svcic/v3rlmo/index.jsp?topic=/com.ibm.storage.svc.console.doc/svc_usingimagemodevdisk_3uwi3k.html, Aug. 31, 2011.

Office Action, dated Aug. 1, 2014, for U.S. Appl. No. 14/201,745, filed Mar. 7, 2014, invented by Ashish Chaurasia et al., Total 15 pages.

Response to Office Action, dated Nov. 3, 2014, for U.S. Appl. No. 14/201,745, filed Mar. 7, 2014, invented by Ashish Chaurasia et al., Total 8 pages.

Notice of Allowance, dated Nov. 19, 2014, for U.S. Appl. No. 14/201,745, filed Mar. 7, 2014, invented by Ashish Chaurasia et al., Total 7 pages.

US Patent Application, filed Aug. 31, 2011, for U.S. Appl. No. 13/222,153 invented by Ashish Chaurasia et al., Total 31 pages.

U.S. Appl. No. 14/201,745, filed Mar. 7, 2014, invented by Ashish Chaurasia et al., Total 37 pages.

NON-DISRUPTIVE CONFIGURATION OF A VIRTUALIZATION CONTROLLER IN A DATA STORAGE SYSTEM

CROSS-REFERENCE TO RELATED APPLICATION

This application is a continuation of U.S. patent application Ser. No. 14/201,745, filed Mar. 7, 2014, which is a continuation of U.S. patent application Ser. No. 13/222,153, filed Aug. 31, 2011, which patent applications are incorporated herein by reference in their entirety.

BACKGROUND

Embodiments of the invention relate to data storage systems, and more particularly, to configuring a virtualization controller in a data storage system without disrupting current I/O operations.

A virtualization controller is a network based storage virtualization system for managing large amounts of heterogeneous data storage in an enterprise data center. The tasks of deploying a virtualization controller in a storage network configuration and using virtual data storage (e.g., virtual disks or volumes) generally require an administrator to stop IO operations to existing disks or logical data storage units (LUNs). Such I/O operations may come from applications running on a host computer.

What is needed is a method and system for configuring a virtualization controller in a data storage system without disrupting I/O operations to existing data storage units.

SUMMARY

Exemplary embodiments of the invention relate to configuring a virtualization controller in a SAN data storage system without disrupting I/O operations between the hosts and the data storage devices.

One aspect of the invention concerns a method that comprises establishing a first data path between a host and a storage controller where the host and storage controller are in the same communication zone and the storage controller comprises disks for storing data; adding a virtualization controller to the zone wherein the virtualization controller maps the disks to virtual volumes and establishes a second data path between the host and the disks through the virtual volumes; removing the first data path; and performing I/O operations between the host and the disks through the second data path.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

Figure 1:
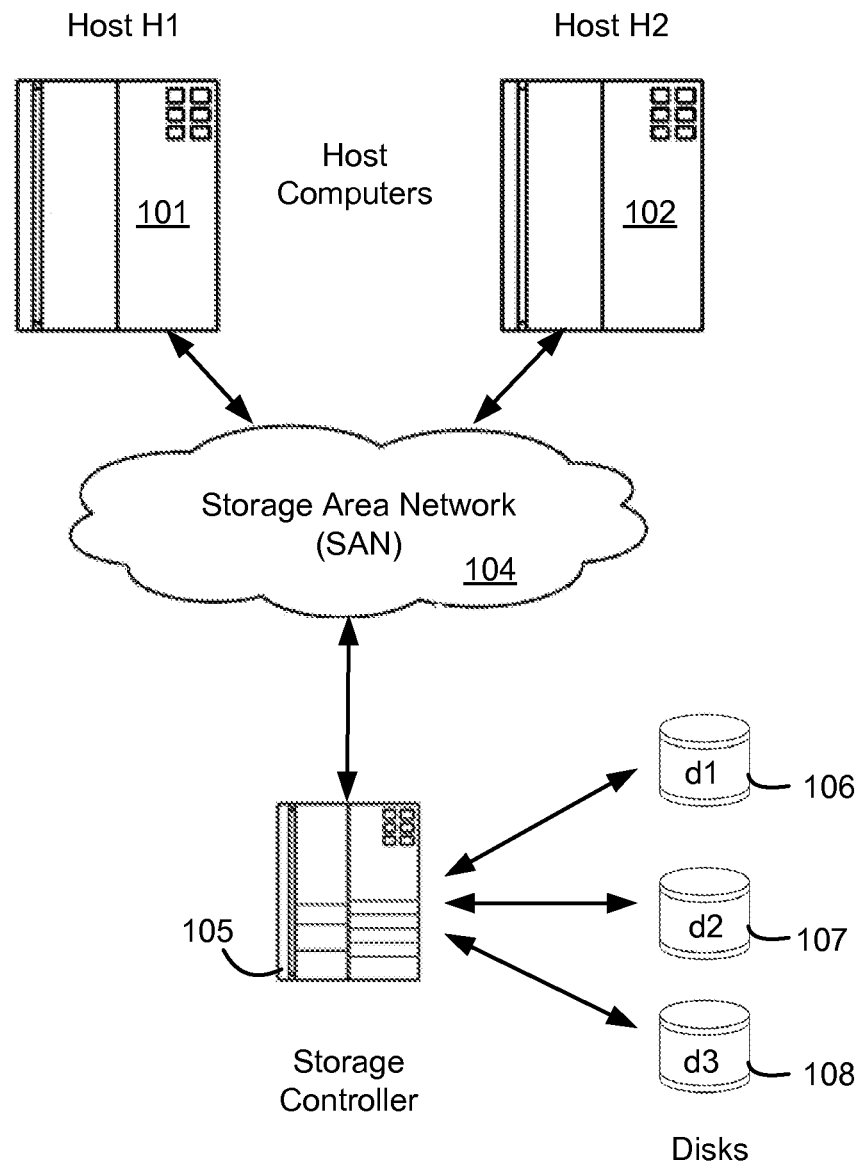
FIG. 1 illustrates an exemplary SAN data storage configuration in which methods and systems for adding a virtualization controller to the configuration without disrupting I/O operations may be provided, according to embodiments of the invention.

The invention relates to methods, systems, and computer program products for configuring a virtualization controller in a SAN data storage system without disrupting I/O operations between the hosts and data storage devices. The invention is described in exemplary embodiments with reference to the Figures, in which like numbers represent the same or similar elements. It will be appreciated by those skilled in the art that variations may be accomplished in view of these teachings without deviating from the spirit or scope of the invention.

Data virtualization is a technology that makes one set of resources look and feel like another set of resources, preferably with more desirable characteristics. The virtualized resources are a logical representation of the original resources that are not constrained by physical limitations, variations, and complexity. A storage virtualization shifts the management of data storage from physical volumes of data to logical volumes of data, and may be implemented at various layers within the I/O stack such as at the disk layer and at the file system layer. A virtualization at the disk layer is referred to as a block-level virtualization or a block aggregation layer. A block-level virtualization may be implemented at any of the three storage domain layers: hosts, storage network (e.g., storage routers and storage controllers), and storage devices (e.g., disk arrays).

For data storage, virtualization may include the creation of a pool of storage that contains several disk systems. The pool can be organized into virtual disks (Vdisks) or image-mode disks that are visible to the host systems using the disks. Vdisks can use mixed back-end storage and provide a common way to manage a storage area network (SAN).

An example of data storage products that provide block-level virtualization is the IBM® SAN Volume Controller (SVC) product model 2145. A SAN virtualization system may be implemented as a clustered appliance in the storage network layer. A fundamental concept of data storage virtualization is to decouple data storage from the storage functions required in a storage area network (SAN) environment. Decoupling means abstracting the physical location of data from the logical representation of the data. A storage virtualization device may present logical entities to the users and internally manage the process of mapping these entities to the actual location of the physical storage. The actual mapping performed is dependent upon the specific implementation, as is the granularity of the mapping, which can range from a small fraction of a physical disk, up to the full capacity of a physical disk.

A single block of information in this environment is identified by its logical unit number (LUN) which is the physical disk, and an offset within that LUN which is known as a logical block address (LBA). The term physical disk is used in this context to describe a unit of storage that might be part of a RAID array in the underlying disk subsystem. Specific to a SAN virtualization controller implementation, the address space that is mapped by the logical entity is referred to as volume, and the physical disk is referred to as managed disks (e.g., Mdisks).

The server and application are only aware of the logical entities, and may access these entities using an interface provided by the virtualization layer such as the SCSI interface. The functionality of a volume that is presented to a server, such as expanding or reducing the size of a volume, mirroring a volume, creating a FlashCopy®, thin provisioning, and so on, is implemented in the virtualization layer. It does not rely in any way on the functionality that is provided by the underlying disk subsystem. Data that is stored in a virtualized environment is stored in a location-independent way, which allows a user to move or migrate data between physical locations, referred to as storage pools.

A block-level storage virtualization in a SAN virtualization controller provides many benefits such as allowing online volume migration while applications are running, simplifying storage management by providing a single image for multiple controllers and a consistent user interface for provisioning heterogeneous storage, and providing enterprise-level copy services functions. In addition, storage utilization can be increased by pooling storage across the SAN, and system performance is improved as a result of volume striping across multiple arrays or controllers and the additional cache that a SAN virtualization controller provides.

A SAN virtualization controller may manage a number of back-end storage controllers or locally attached disks and map the physical storage within those controllers or disk arrays into logical disk images or volumes, which are seen by application servers and workstations in the SAN. The SAN may be zoned so that the application servers cannot see the back-end physical storage, which prevents any possible conflict between the SAN virtualization controller and the application servers both trying to manage the back-end storage.

Each virtualization controller hardware unit may be referred to as a node. The node provides the virtualization for a set of volumes, cache, and copy services functions. Storage nodes in a virtualization controller may be deployed in pairs and multiple pairs make up a cluster. In current virtualization controllers, a cluster may consist of multiple node pairs or I/O groups. All configuration, monitoring, and service tasks in a virtualization controller may be performed at the cluster level. Configuration settings may be replicated to all nodes in the cluster.

The cluster and its I/O groups may view the storage that is presented by back-end controllers as a number of disks or LUNs, known as managed disks or Mdisks. An Mdisk is usually provisioned from a RAID array. The application servers, however, do not see the Mdisks. Instead they see a number of logical disks, known as virtual disks or volumes, which are presented by the cluster's I/O groups through a SAN (e.g., through a Fibre Channel protocol) or LAN (e.g., through an iSCSI protocol) to the servers. Each Mdisk presented from an external disk controller has an online path count that is the number of nodes having access to that Mdisk. The maximum count is the maximum paths detected at any point in time by the cluster.

Volumes are logical disks presented to the hosts or application servers by a virtualization controller. When a host performs I/Os to one of its volumes, all the I/Os for a specific volume are directed to one specific I/O group in the cluster. The virtualization controller may present a volume to a host through different ports in the virtualization controller, thus providing redundant paths to the same physical storage devices. Redundant paths or multi-paths establish two or more communication connections between a host system and the storage device that it uses. If one of these communication connections fails, another communication connection is used in place of the failed connection. The allocation and management of the multiple paths to the same storage devices may be handled by multi-path software.

The multi-path software may monitor host storage initiator functions where storage I/Os originate and where communications failures are identified. The multi-path software typically runs in the kernel space of the host systems, e.g., as multi-path drivers. There are various ways for implementing the multi-path drivers, depending on the operating system. Some operating systems may provide application programming interfaces (APIs) for integrating third-party multi-path software. For example, the multi-path drivers may be implemented between a SCSI command driver and a low-level device driver.

Today when a virtualization controller is added to a data center to provide storage virtualization, one possible configuration process is to virtualize back-end disks using a virtualization controller and expose the newly created virtual disks to the host (by an appropriate zoning and LUN mapping). The operator may need to change the application configuration files on the host to use the newly exposed virtual disks, then stop and restart the application to use the new virtual disks. In this process, the operation of the data center is disrupted as the applications must be stopped and restarted in order to insert the virtualization controller into the data paths. This disruption may be the same for other virtualization devices similar to a virtualization controller. Embodiments of the invention eliminate this disruption by allowing I/O operations to fail over to alternate data paths through a virtualization controller, transparently to the applications running in the hosts.

Referring now to the drawings and in particular to FIG. 1, there is illustrated an exemplary SAN based data storage system in which methods and systems for configuring a virtualization controller may be provided according to embodiments of the invention. The methods and systems disclosed herein may be applicable to a wide variety of different computers, servers, storage systems, and networks in addition to the illustrated configuration. The computing configuration 100 may comprise one or more host computers 101-102 from which users and applications may access data stored on disks 106-108 (d1, d2 and d3), or other data storage devices such as solid state memories, optical discs, and magnetic tape drives.

Host computers 101-102 may include CPUs (Central Processing Units) and memory for executing various programs, thereby providing a variety of computing functions to users and applications. For example, host computers 101-102 may be servers that host applications to provide Web services and database services to users and applications.

The disks 106-108 may be part of a storage controller 105 which is connected to the hosts 101-102 through a storage area network (SAN) fabric 104. The SAN fabric 104 may comprise one or more network routers and network controllers, and be supported by an Fibre Channel channel interface protocol or other interface protocols.

Data storage controller 105 may comprise one or more controllers, disk arrays and tape libraries. For example, the data storage controller 105 may comprise IBM® System Storage® DS8000®. The 58000® systems are high-performance, high-capacity storage controllers providing disk storage that is designed to support continuous operations. The storage controllers may include host adapters for interfacing with host computer 104 and device adapters for interfacing with attached storage devices such as disks and solid state drives. The host adapters may support various host-device interface protocols such as Fibre Channel (FC), Fibre Channel Arbitration Loop (FC-AL), Fibre Channel over Ethernet (Foe), Internet Small Computer System Interface (iSCSI), etc.

Data storage controller 105 may comprise hard disk drives, solid state drives, arrays of hard disk drives or solid-state drives, tape drives, tape libraries, CD-ROM libraries, or the like. Further, data storage controller 105 may comprise multiple levels such as a primary level of solid state storage, a secondary level of disk storage, and a third level of tape libraries.

Figure 2:
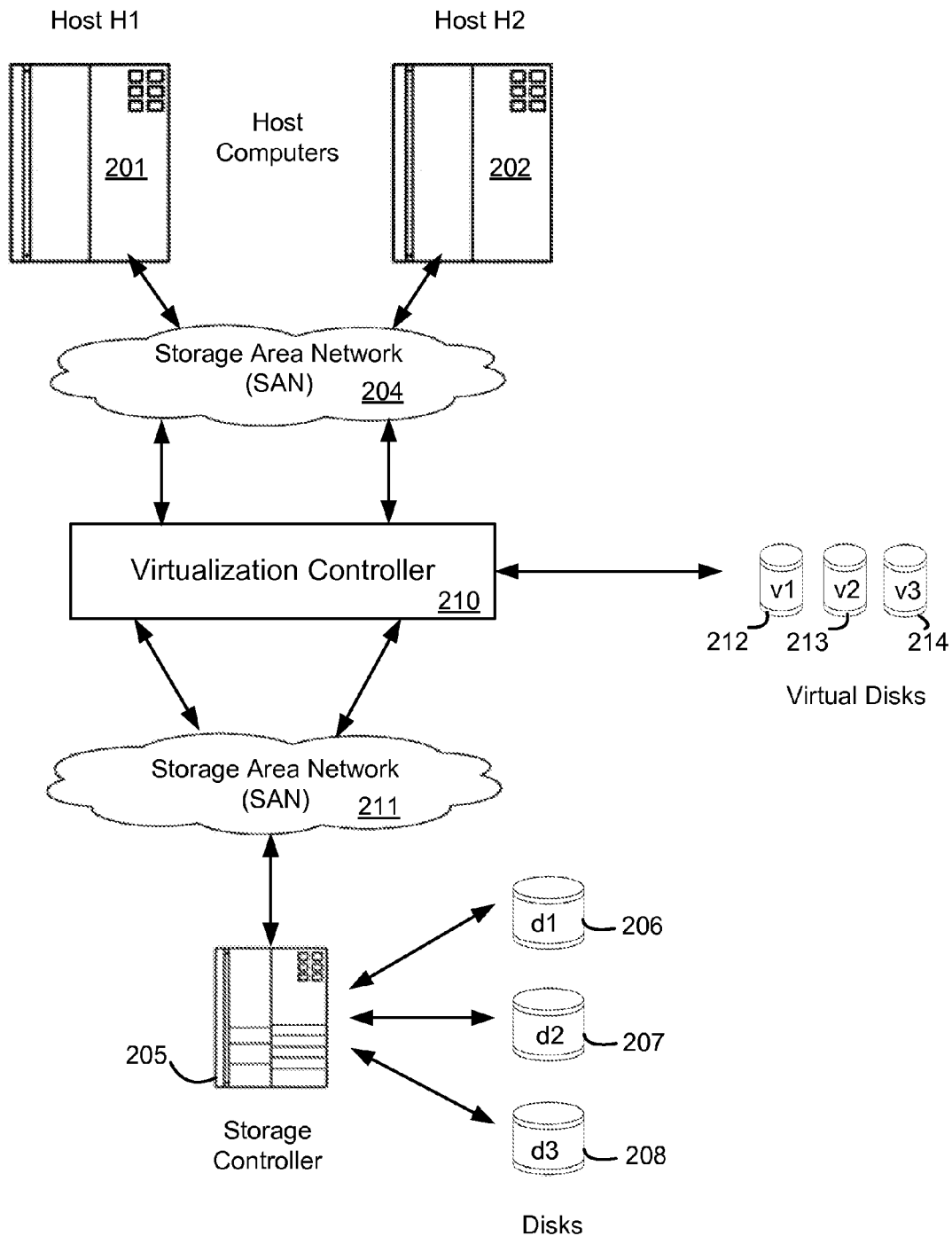
FIG. 2 illustrates a SAN data storage system that includes a virtualization controller in which exemplary embodiments of the invention may be implemented.

FIG. 2 illustrates a SAN data storage system that includes a virtualization controller for providing storage virtualization functions and exemplary embodiments of the invention. As in the storage configuration of FIG. 1, the hosts 201-202 are connected to data storage devices 206-208, which may be part of a storage controller 205, through a SAN fabric 204. A virtualization controller 210 may be coupled to the SAN fabric 204 and to the storage controller 205 through a second SAN fabric 211. Each of the SAN fabrics 204 and 211 may comprise one or more network controllers, communication interfaces, and respective communication protocol implementations such as Fibre Channel and iSCSI protocols.

The virtualization controller 210 and hosts 201-202 may be viewed as being in the same " " for communication purposes. In a storage area network (SAN), zoning is the allocation of resources for device load balancing and for selectively allowing access to data only to certain users. Essentially, zoning allows an administrator to control who can see what in a SAN. Zoning may be achieved using a structure similar to that of a computer file system. A zone is the equivalent of a folder or directory. Zoning can be either hard or soft. In hard zoning, each device is assigned to a particular zone, and this assignment does not change. In soft zoning, device assignments can be changed by the network administrator to accommodate variations in the demands on different servers in the network. The use of zoning minimizes the risk of data corruption, viruses and worms, and minimizes the time necessary for servers to reboot.

With the virtualization controller 210 and hosts 201-202 being in the same zone, the virtualization controller 210 may create virtual disks 1, 2, and 3 (212-214), which may respectively correspond to physical disks 1, 2, and 3 (206-208), and expose the virtual disks 1, 2, and 3 (212-214) to hosts 201-203. For example, the virtualization controller 210 may map virtual disk 1 (212), which corresponds to physical disk 1 (206) to host system 201. Virtual disks 1, 2, and 3 (212-214) are also referred to as volumes or virtual image mode disks.

Figure 3:
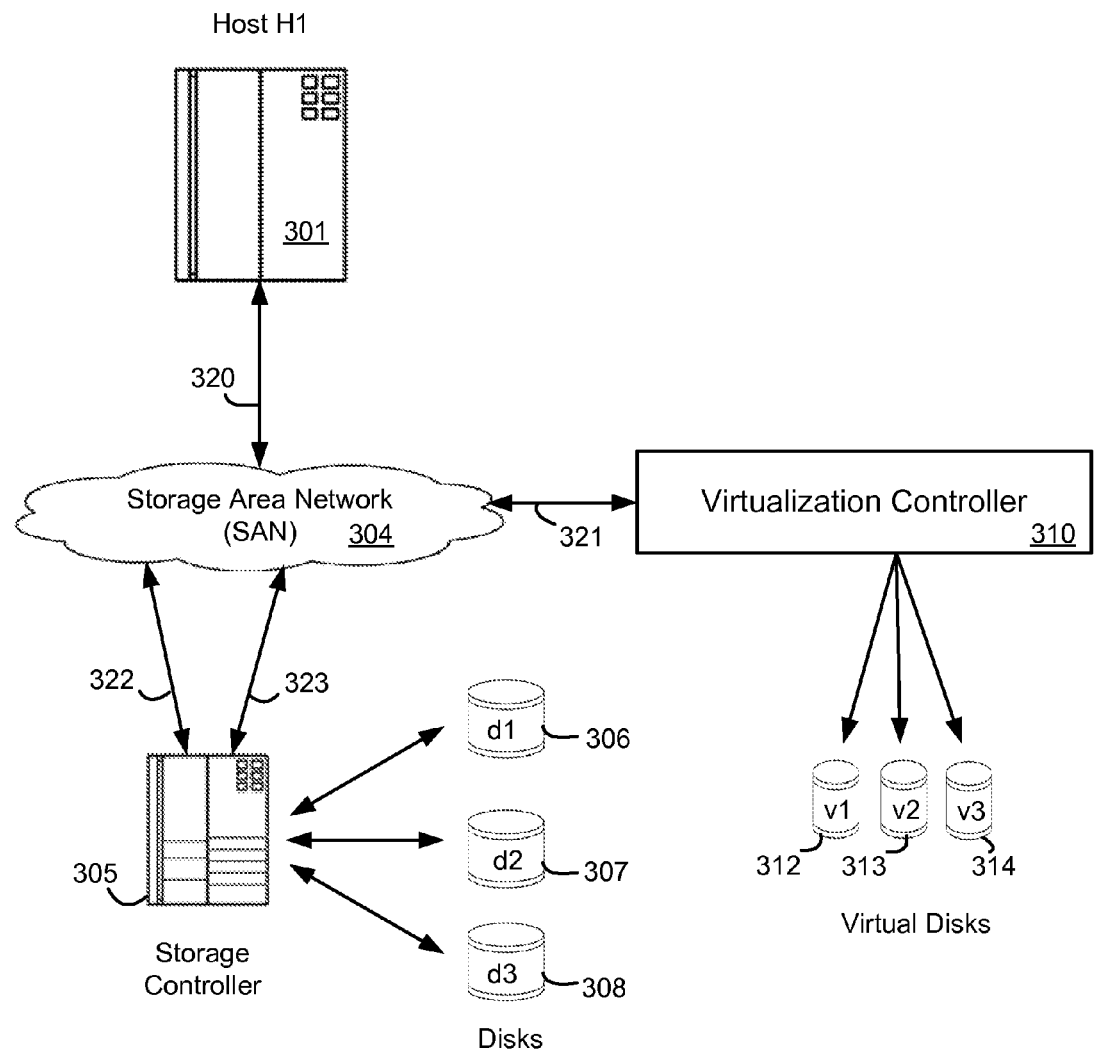
FIG. 3 illustrates an exemplary SAN data storage configuration that includes multiple data paths between a host and disks in which embodiments of the invention may be implemented.

FIG. 3 illustrates an example of a SAN data storage configuration in which a virtualization controller maps physical disks into virtual disks and creates alternate data paths between a host and disks, for which embodiments of the invention may be provided. For clarity, only one host 1, one SAN fabric, and one physical disk 1 are shown in FIG. 3. Host 1 (301) is coupled to SAN fabric 304 by connection 320. A virtualization controller 310 is also coupled to the SAN fabric 304 by connection 321, and storage controller 305 is coupled to the SAN fabric 304 by connections 322-323. As illustrated in FIGS. 1 and 2, the virtualization controller 310 may create three cache-disabled image mode virtual disks 1, 2 and 3 (312-314), which are respectively mapped to physical disks 1, 2 and 3 (306-308). The virtualization controller 310 may further expose the virtual disk 1 (312) to host 1 (301) as shown in FIG. 3. With the presence of the virtualization controller 310 in the illustrated SAN storage configuration, there are now more than one data paths between host 1 (301) and the physical disks 306-308 in the storage controller 305. These multiple data paths are logical data paths and are illustrated in more detail in FIG. 4.

Figure 4:
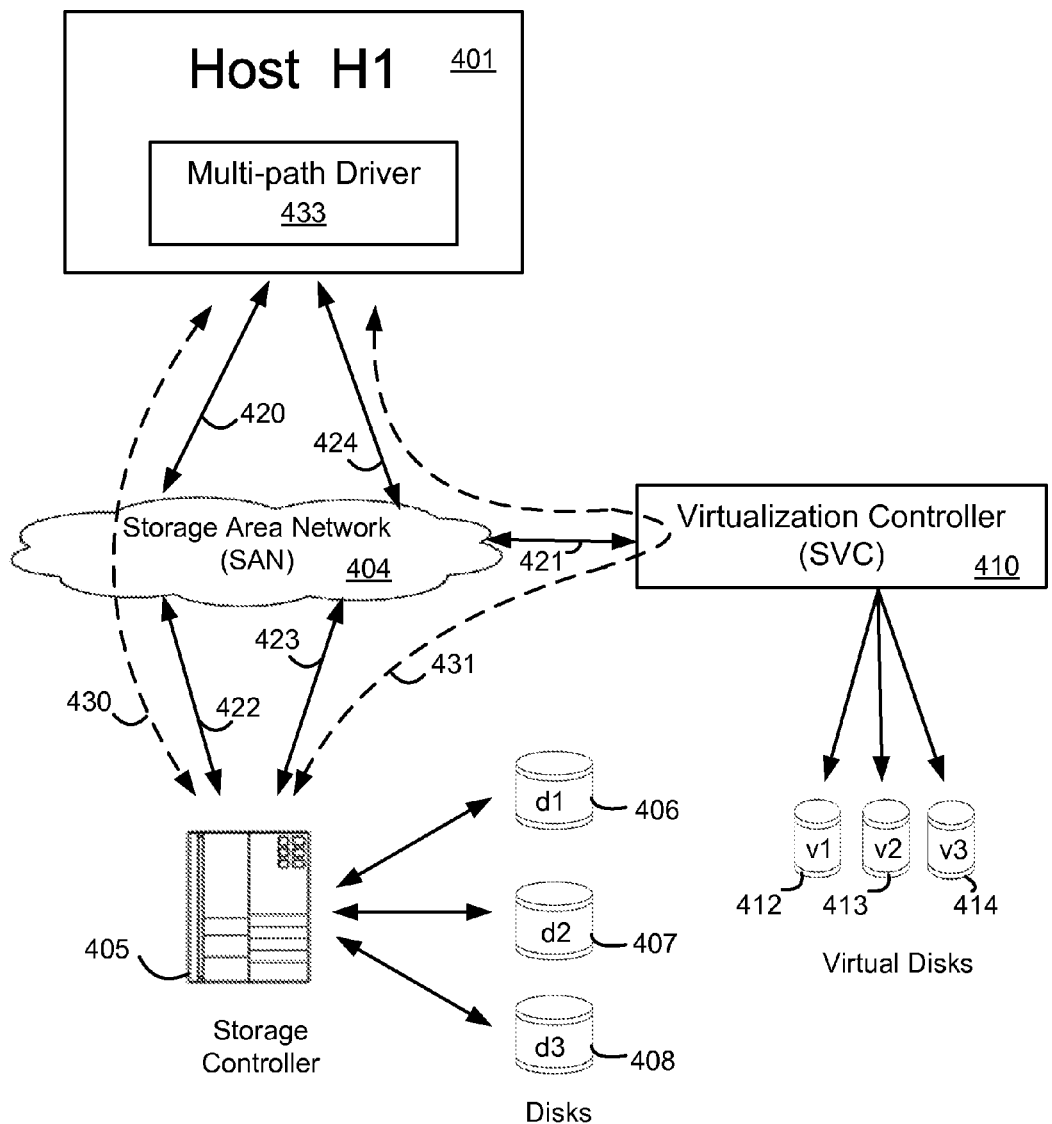
FIG. 4 illustrates multiple logical data paths between a host and disks in a SAN data storage system in which a virtualization controller may create alternate data paths, according to an embodiment of the invention.

FIG. 4 illustrates multiple logical data paths between host 1 (301) and disks 406-408. The first logical data path 430 is through connection 420 between host 1 (401) and SAN fabric 404, and connection 422 between the SAN fabric 404 and storage controller 405. This is the only data path that the host 1 (401) may use to access the physical disks 406-408 in the storage controller 405 when the virtualization controller 410 is not present in the configuration.

With the addition of the virtualization controller 410, the host 1 (401) may now access data in the physical disks 406-408 through a second logical data path 431. The second logical data path 431 is established through three connection segments: segment 424 between host 1 (401) and SAN fabric 404, segment 421 between SAN fabric 404 and virtualization controller 410, and segment 423 between the SAN fabric 404 and storage controller 405. The multiple logical data paths 430 and 431 may be identified by a multi-path driver 433 in the host 1 (401). This identification is possible because the image mode virtual disks 1, 2, and 3 mimic the SCSI-3 unique LUN Identifiers of the physical disks 1, 2, and 3, respectively. The multiple logical data paths 430-431 between host 1 (401) and storage controller 405 allow the host 1 (401) to perform I/O operations on physical disks 406-408 through any of the logical paths 430-431.

Figure 5:
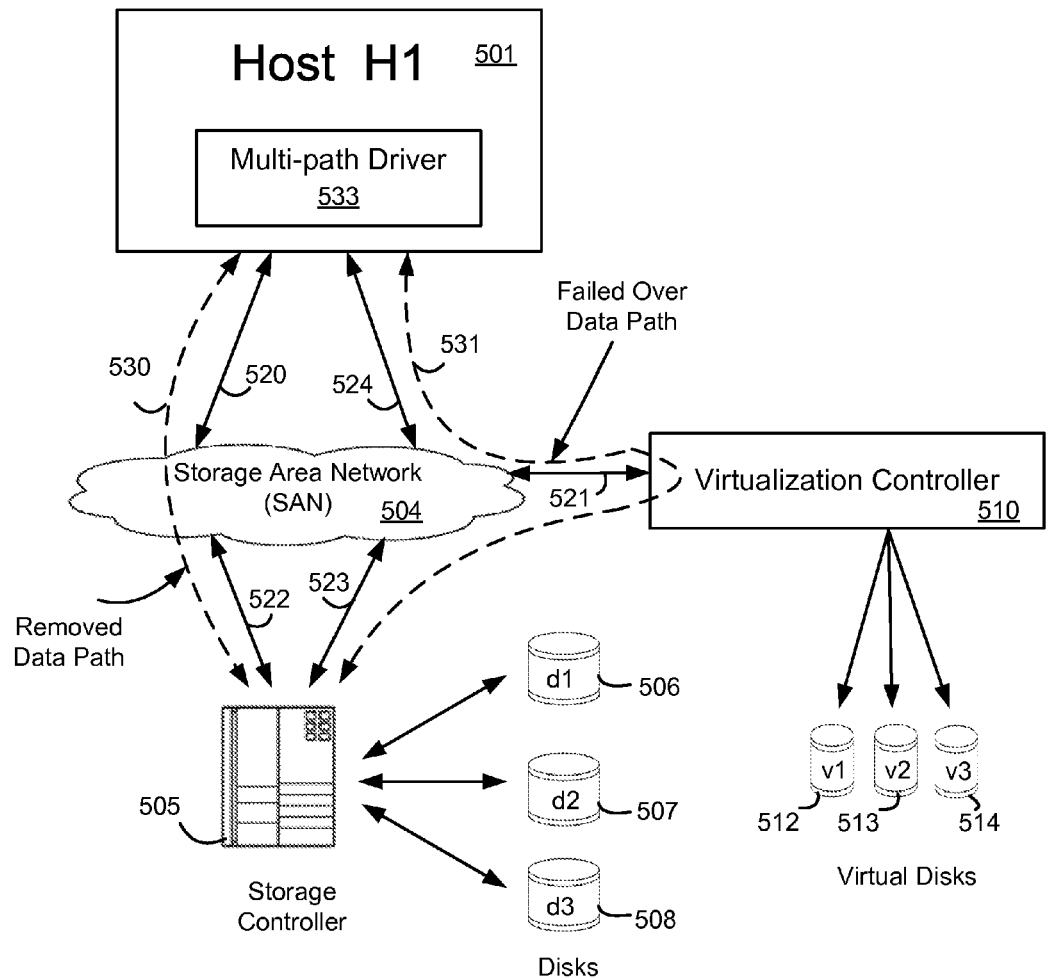
FIG. 5 illustrates the removal of a logical data path between a host and disks which allows I/O operations to fail over to an alternate data path through a virtualization controller, according to an embodiment of the invention.

FIG. 5 illustrates the removal of a direct data path 530 between host 1 (501) and storage controller 505 in a SAN storage configuration to allow I/O operations to fail over to an alternate data path 531 through a virtualization controller 510. In an exemplary embodiment of the invention, once the virtualization controller 510 establishes a logical data path 531 between host 1 (501) and storage controller 505, the SAN configuration may perform a "zoning-out" operation to remove the data path 530 between the host 1 (501) and the storage controller 505. All I/O operations between the host 1 (501) and disks 506-508 will now automatically fail over to the second logical data path 531 which is through the virtualization controller 510.

Fail-over is an operational mode in which the functions of a system component (such as a processor, server, network, or database) are assumed by secondary system components when the primary component becomes unavailable. The procedure involves automatically offloading tasks to a standby system component so that the procedure is as seamless as possible to the end user. Fail-over can apply to any aspect of a system or network such as a connection path or a storage device. Storage networks may use many paths between a host and a storage system. The capacity for automatic fail-over means that normal functions can be maintained despite any changes or interruptions in the network configuration.

In an embodiment of the invention, a storage configuration utility may disable a data caching function in the virtualization controller 510 that provides caching of the image mode volumes (e.g., virtual disk 1) when a virtualization controller is introduced into the data storage system. Such a disabling of the data caching prevents data corruption that may result during the configuration of the virtualization controller. In a typical operation, when a host multi-path driver detects two active paths to the same disk, it can send data through both paths in a round robin fashion. If caching were enabled on the virtualization controller 510, a write command from the host 1 may cause a data caching on virtualization controller 510. This means that the back-end storage controller 505 does not contain the data that is written to disks (as the data is still cached on the virtualization controller 510).

Since the multi-path driver on the host 1 (501) may determine that the two data paths lead to the same disk, it can subsequently issue a read command to the storage controller 505 directly on the same data block that was written earlier. This operation will return the old (and therefore incorrect or stale data) because the latest data is still cached on virtualization controller 510 and the storage controller 505 never received the last write command. The described scenario is an example of the data corruption that may occur if caching is enabled in the virtualization controller 510.

With data caching disabled in the virtualization controller 510, all data written to the virtual disk 1 (512) will go directly through data path 531 and virtualization controller 510 to the back-end storage controller 505 and the physical disk d1 (506). Hence, a subsequent read command via the direct path from host to the storage controller 505 that contains disk 1 (506) will receive the latest data.

Once I/O operations between the host 1 (501) and storage controller 505 have failed over to the alternate data path 531 through the virtualization controller 510, data caching in the virtualization controller 510 may be enabled again for caching the image mode data volumes, e.g., volume 1 (512). The virtualization controller 510 has thus been added to the data storage configuration illustrated in FIG. 5 without disrupting I/O operations between the host 1 (501) and the disks 506-508 of the storage controller 505.

Figure 6:
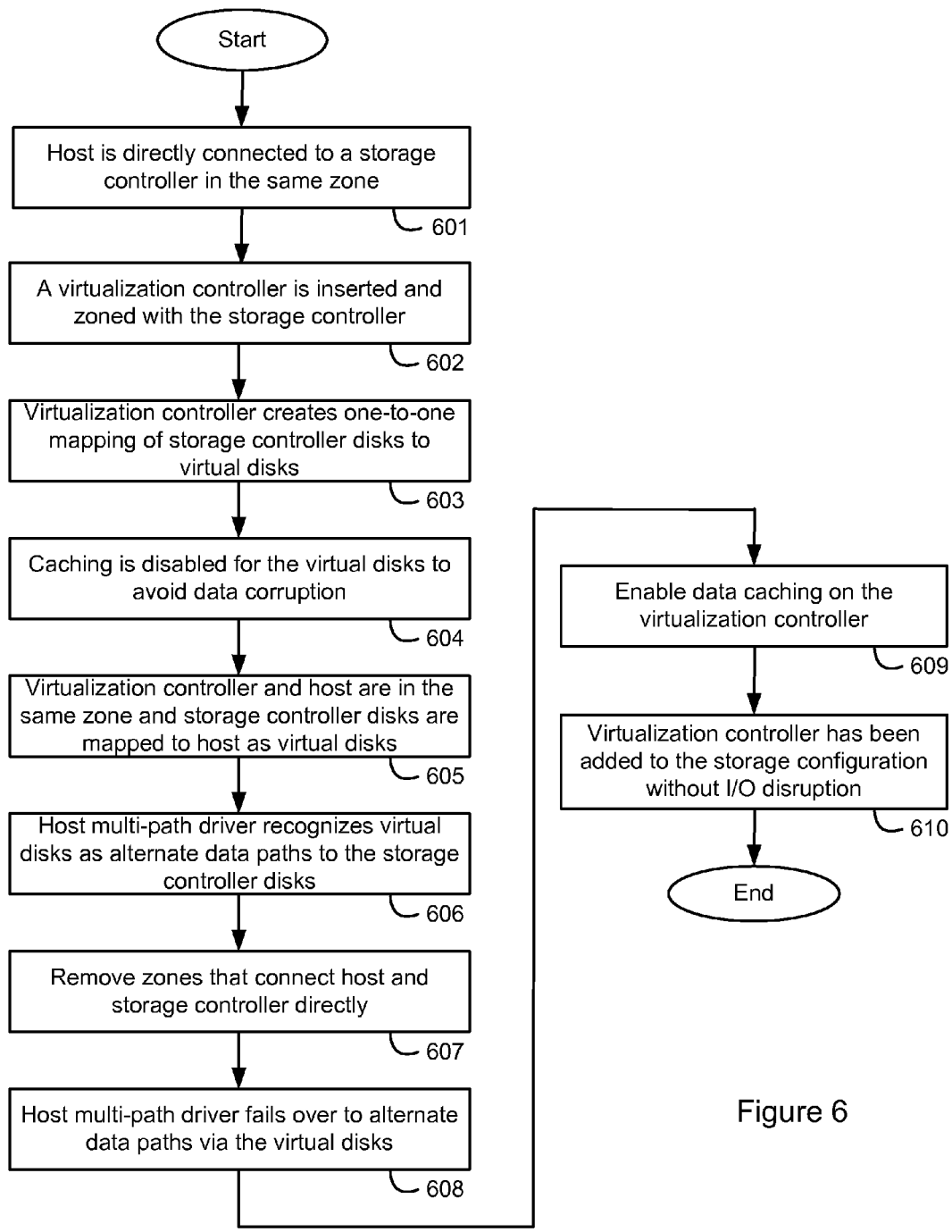
FIG. 6 is a flowchart of a process for configuring a virtualization controller in a data storage system without disrupting data I/O operations between host systems and storage devices, according to an embodiment of the invention.

FIG. 6 is a flowchart of an exemplary process for configuring a virtualization controller 510 in a data storage system without disrupting I/O operations between host systems and storage devices, according to an embodiment of the invention. At step 601, a host may be directly connected to a storage controller, i.e., the host and storage controller are in the same zone. An operator may add a virtualization controller 510 to the data storage configuration, at step 602, where the virtualization controller 510 is zoned with the storage controller 505. The virtualization controller 510 may set up a one-to-one mapping of the disks 506-508 in the storage controller 505 to virtual or image mode disks 512-514 that the virtualization controller 510 creates, at step 603. In one embodiment, the virtual disks 512-514 may respectively mimic the SCSI-3 unique identifiers of the storage controller disks 506-508.

At step 604, the virtualization controller 510 may disable its data caching function so that data of the virtual disks 512-514 are not cached, to avoid data corruption in the storage system. The virtualization controller 510 is now zoned with the host 501, and the physical disks 506-508 in the storage controller 505 are respectively mapped to the host 501 as virtual disks 512-514, as shown by step 605. At step 606, the host multi-path drivers 533 may now recognize the virtual disks 512-514 as alternate data paths between the hosts (501) and the disks in the storage controller (505). The process may further remove the zones (i.e., data paths) that allow direct communication between the hosts and storage controllers, at step 607.

Multi-path drivers in the hosts automatically fail over to the alternate data path through the virtual disks established by the image mode of the virtualization controller 510, at step 608. The process may subsequently enable data caching of the virtual disks in the virtualization controller 510, at step 609. The virtualization controller 510 has thus been added to the data storage system without disrupting I/O operations between the hosts 501 and the data storage controllers 505, as shown by step 610.

Figure 7:
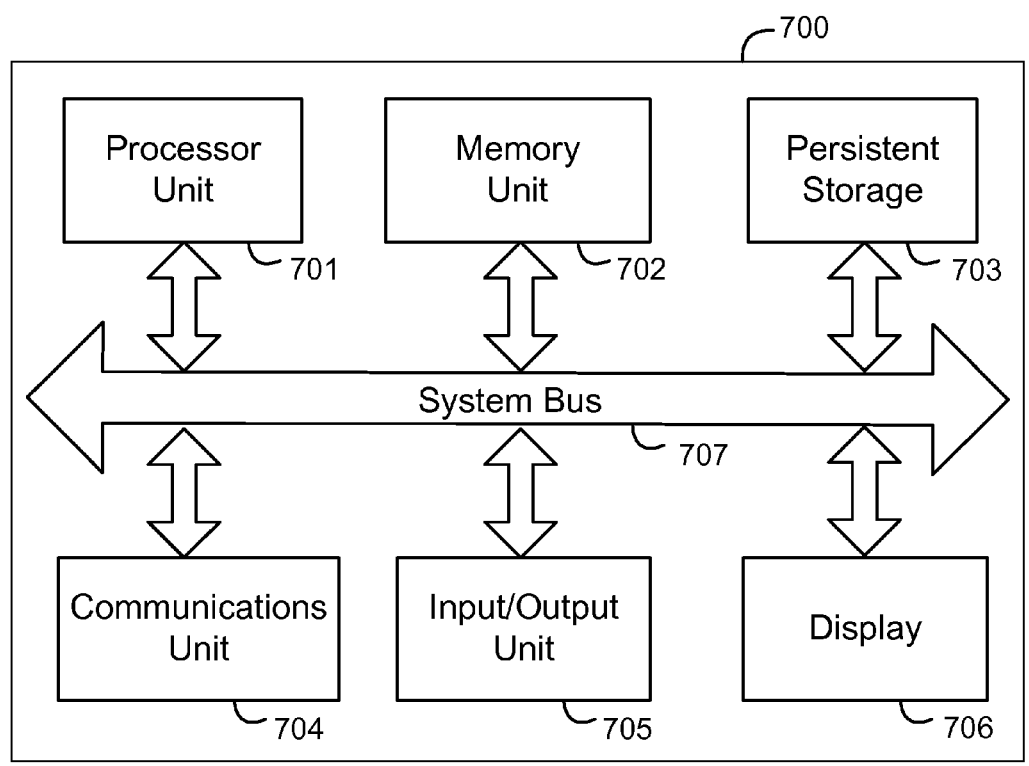
FIG. 7 is a block diagram of a computer that may be part of a host, network router, virtualization controller, or storage controller, according to an embodiment of the invention.

FIG. 7 illustrates a block diagram of a computer that may be part of a host, network router, virtualization controller, or storage controller, in accordance with an embodiment of the invention. Computer 700 may include a processor 701, a memory 702, a persistent storage 703, a communications unit 704, an input/output unit 705, a display 706, and system bus 707. As an example, processor unit 701 may include one or more processing cores and computer memory 702 may comprise EEPROM memory modules. Communications unit 704 may include network interface adapters, modems and support software. Input/output unit 705 may include a keyboard, mouse, and printer. Persistent storage 703 may comprise a hard disk drive or an optical disk drive.

Computer programs are typically stored in persistent storage 703 until they are needed for execution, at which time the programs are brought into memory unit 702 so that they can be directly accessed by processor unit 701. Processor 701 selects a part of memory 702 to read or write based on an address in memory 702 provided along with a read or write request. Usually, the reading and interpretation of an encoded instruction at an address causes processor 701 to fetch a subsequent instruction, either at a subsequent address or some other address.

An operating system runs on processor unit 701 to coordinate and control various components within computer 700 and to perform system tasks required by applications running on the computer 700. The operating system may be a commercially available or open source operating system, as are well known in the art.

Instructions for the operating system and applications or programs may be stored are located on storage devices, such as a hard disk drive 703. These instructions and may be loaded into main memory 702 for execution by processor 701. The processes of the illustrative embodiments may be performed by processor 701 using computer implemented instructions, which may be located in memory 702. Some of the processes may read from or write data to a data storage device such as hard disk drive 703.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. For example, audio, text, spreadsheets, and databases could be encapsulated with meta data. Such audio may include information on heart murmurs. Text could include patient medical records and financial. Spreadsheets and databases may include company or hospital-wide activities.

As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, elector-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infinitude, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for configuring a data storage system, comprising:
    establishing a first data path between a host and a storage controller that interfaces with the host and a plurality of storage devices for storing data, wherein the host accesses the storage devices through the storage controller, wherein the host and the storage devices are in a communication zone;
    establishing a second data path between the host and the storage devices through virtual volumes established by a virtualization controller, wherein the host recognizes the virtual volumes as an alternate data path to the first data path between the hosts and the storage devices that goes through the virtualization controller;

removing the first data path between the host and the storage controller in response to establishing the second data path;

performing I/O operations between the host and the storage devices through the second data path and the virtualization controller.

2. The method of claim 1, wherein the storage devices are coupled to the storage controller, and the storage controller is coupled to the host.

3. The method of claim 1, further comprising disabling data caching in the virtualization controller during the configuration.

4. The method of claim 3, further comprising:
enabling data caching in the virtualization controller for caching the virtual volumes.

5. The method of claim 1, further comprising:
creating a mapping of the storage devices to virtual disks, wherein the virtualization controller and the virtual disks are added to the data storage configuration without disrupting Input/Output operations to the storage devices.

6. The method of claim 1, wherein the virtual volumes are mapped one-to-one to the storage devices.

7. The method of claim 1, wherein the virtualization controller and the host are in the same zone.

8. A computer program product comprising a non-transitory computer readable storage medium having computer readable program code embodied therewith, the computer readable program code that when executed by a processor performs operations, the operations comprising:
establishing a first data path between a host and a storage controller that interfaces with the host and a plurality of storage devices for storing data, wherein the host accesses the storage devices through the storage controller, wherein the host and the storage devices are in a communication zone;
establishing a second data path between the host and the storage devices through virtual volumes established by a virtualization controller, wherein the host recognizes the virtual volumes as an alternate data path to the first data path between the hosts and the storage devices that goes through the virtualization controller;
removing the first data path between the host and the storage controller in response to establishing the second data path;
performing I/O operations between the host and the storage devices through the second data path and the virtualization controller.

9. The computer program product of claim 8, wherein the storage devices are coupled to the storage controller, and the storage controller is coupled to the host.

10. The computer program product of claim 8, further comprising disabling data caching in the virtualization controller during the configuration.

11. The computer program product of claim 10, further comprising:
enabling data caching in the virtualization controller for caching the virtual volumes.

12. The computer program product of claim 8, further comprising:
creating a mapping of the storage devices to virtual disks, wherein the virtualization controller and the virtual disks are added to the data storage configuration without disrupting Input/Output operations to the storage devices.

13. The computer program product of claim 8, wherein the virtual volumes are mapped one-to-one to the storage devices.

14. The computer program product of claim 8, wherein the virtualization controller and the host are in the same zone.

15. A system configured to be coupled to a storage area network (SAN), comprising:
a memory;
a processor coupled to the memory and configured to:
establishing a first data path between a host and a storage controller that interfaces with the host and a plurality of storage devices for storing data, wherein the host accesses the storage devices through the storage controller, wherein the host and the storage devices are in a communication zone;
establishing a second data path between the host and the storage devices through virtual volumes established by a virtualization controller, wherein the host recognizes the virtual volumes as an alternate data path to the first data path between the hosts and the storage devices that goes through the virtualization controller;
removing the first data path between the host and the storage controller in response to establishing the second data path;
performing I/O operations between the host and the storage devices through the second data path and the virtualization controller.

16. The system of claim 15, wherein the storage devices are coupled to the storage controller, and the storage controller is coupled to the host.

17. The system of claim 15, further comprising disabling data caching in the virtualization controller during the configuration.

18. The system of claim 17, further comprising:
enabling data caching in the virtualization controller for caching the virtual volumes.

19. The system of claim 15, further comprising:
creating a mapping of the storage devices to virtual disks, wherein the virtualization controller and the virtual disks are added to the data storage configuration without disrupting Input/Output operations to the storage devices.

20. The system of claim 15, wherein the virtualization controller and the host are in the same zone.

* * * * *